US007808243B2

(12) United States Patent
Feld et al.

(10) Patent No.: US 7,808,243 B2
(45) Date of Patent: Oct. 5, 2010

(54) CIRCULATOR AND MAGNETIC RESONANCE DEVICE

(75) Inventors: Peter Feld, Nürnberg (DE); Georg Rauh, Zirndorf (DE); Wilfried Schnell, Forchheim (DE); Markus Vester, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1 day.

(21) Appl. No.: 12/281,494

(22) PCT Filed: Jan. 22, 2007

(86) PCT No.: PCT/EP2007/050585

§ 371 (c)(1),
(2), (4) Date: Sep. 3, 2008

(87) PCT Pub. No.: WO2007/101741

PCT Pub. Date: Sep. 13, 2007

(65) Prior Publication Data

US 2009/0051363 A1 Feb. 26, 2009

(30) Foreign Application Priority Data

Mar. 3, 2006 (DE) ...................... 10 2006 010 003

(51) Int. Cl.
*G01V 3/00* (2006.01)

(52) U.S. Cl. ...................................................... 324/318

(58) Field of Classification Search .......... 324/300–322
See application file for complete search history.

(56) References Cited

U.S. PATENT DOCUMENTS 3,761,924 A 9/1973 McGowan
4,595,889 A 6/1986 Stitzer et al.
2002/0039054 A1 4/2002 Kocharyan

FOREIGN PATENT DOCUMENTS

DE 42 04 299 A1 8/1993
GB 1 360 080 7/1974
WO WO 92/18874 10/1992

OTHER PUBLICATIONS

Patent Abstracts of Japan Publication No. 04020849, for Japanese Application No. 02124347.

*Primary Examiner*—Brij B Shrivastav
*Assistant Examiner*—Dixomara Vargas
(74) *Attorney, Agent, or Firm*—Schiff Hardin LLP

(57) ABSTRACT

A circulator has a ferrite, and the circulator is arranged in the vicinity of a device that produces a static magnetic field in the environment surrounding the device, this static magnetic field giving the circulator a non-reciprocal behavior, with respect to circulation of energy among the gates of the circulator, as a result of interaction of the ferrite with the static magnetic field. A magnetic resonance apparatus embodies such a circulator, and the basic field magnet of this magnetic resonance apparatus generates the static magnetic field.

13 Claims, 3 Drawing Sheets

CIRCULATOR AND MAGNETIC RESONANCE DEVICE

BACKGROUND OF THE INVENTION

Field of the Invention

The present invention concerns a circulator, in particular for use in radio-frequency systems of a magnetic resonance apparatus, as well as a magnetic resonance apparatus with such a circulator.

Magnetic resonance (MR) imaging is a known and firmly established method that is in particular used in medical imaging. A body to be examined is introduced into a strong, homogeneous, static magnetic field (known as the basic magnetic field) that causes an alignment of the nuclear spins of atomic nuclei in the body, in particular of hydrogen atoms (protons) bound to water. These nuclei are excited to a precession movement around the basic magnetic field by means of radio-frequency excitation pulses. After the end of a corresponding radio-frequency (RF) excitation pulse, the nuclear spins precess at a frequency known as the Larmor frequency, which depends on the strength of the basic magnetic field. Due to various interaction types, the nuclear spins align along the preferred direction (predetermined by the basic magnetic field) with a characteristic time curve. The time curve is, among other things, tissue dependent and can be described using characteristics known as relaxation times. An image can be generated from the spatial distribution of the nuclear spin density in connection with the respective relaxation times via computational and/or measurement analysis of the integral, radio-frequency nuclear signals. The association of the nuclear magnetic resonance signal (detectable as a result of the precession movement) with the point of its origin ensues by the application of magnetic field gradients. For this purpose, gradient fields are superimposed on the basic magnetic field and controlled such that an excitation of the nuclei occurs only in a slice to be imaged. Imaging systems based on these physical effects are also known under the designations nuclear spin tomography, nuclear magnetic resonance (NMR) tomography and magnetic resonance imaging (MRI).

A radio-frequency system with a radio-frequency antenna is required both for RF excitation of the nuclear spins and for detection of the nuclear spin signals.

At the transmitter side, the radio-frequency system has at least one radio-frequency amplifier (RFPA—radio-frequency power amplifier") that amplifies a control signal that is thereupon conducted to a radio-frequency antenna and is fed via one or more input ports into the radio-frequency antenna. A non-optimal matching of the input port of the radio-frequency antenna leads to partial, significant return voltages or powers. In practice an optimal matching of the input port of the radio-frequency antenna is seldom present since the matching also depends on, among other things, the load of the radio-frequency antenna, which varies with the body to be examined. Therefore the signal fed into the radio-frequency antenna angle is normally at least partially reflected. The components (in particular radio-frequency power amplifier) upstream from the input port of the radio-frequency antenna must tolerate this reflected power without damage.

Often multi-port antennas that have at least 2 (typically 8, 16 or 32) input ports coupled among one another are used in magnetic resonance apparatuses. The control signals for the input ports are typically generated by multiple radio-frequency power amplifiers. Ideally, each input port is fed by its own radio-frequency power amplifier. In that the input ports are coupled among one another, over-coupled voltages can occur at the input ports. These voltages add to the voltages reflected at the input ports and returning, such that the radio-frequency power amplifiers which activate an input port of a multi-port antenna are exposed to particularly high loads.

The problem of the reflected and over-coupled voltage can be solved by an over-dimensioning of the radio-frequency power amplifier. The peak voltage of the radio-frequency power amplifier is selected well above the forward voltage that is necessary in operation, such that the peak voltage is in each case greater than the sum of the forward voltage and the voltage of the return signal. However, the cost of the radio-frequency power amplifier is increased thereby.

Another possibility is to arrange a circulator or a one-way conductor (isolator) at the output port of the radio-frequency power amplifier or in the radio-frequency power amplifier itself, such that the returning power does not reach the radio-frequency power amplifier and additionally load the amplifier.

A circulator is a passive component with at least three gates in which a power fed to one gate is presented, attenuated by a slight transmission loss, to another gate, while all remaining gates are largely decoupled; thus only the power reduced by a high suppression loss is present at those gates. The ports of the circulator are characterized by a cyclical sequence, meaning that a power presented at any of the gates is handed off to the respective next gate. An isolator is likewise a passive component with two connections (ports) that ideally passes an electromagnetic power only in one direction.

This non-reciprocal behavior is typically generated in circulators and isolators by a ferrite that is located in a static magnetic field that is generated by a permanent magnet surrounding the ferrite. The ferrite assumes a gyrotropic response due to the magnetic field of the permanent magnet. Radio-frequency signals that are fed to a gate are merely relayed to the next gate. The desired, non-reciprocal response occurs within a specific frequency range that can be determined by suitable dimensioning of the ferrite and the magnitude of the static magnetic field.

During the operation of a circulator, radio-frequency losses heat the circulator, in particular its ferrite and its permanent magnet. This leads to a change of the signal transfer with regard to amplitude and phase of the transferred signal. Problems thereby arise with regard to the necessary precision of the transmission of the radio-frequency signals in a magnetic resonance apparatus.

SUMMARY OF THE INVENTION

An object of the present invention is to provide a circulator that has a simple design, is cost-effective to produce and with which a precise and constant signal transfer is enabled. Furthermore, an object of the invention is to provide a magnetic resonance apparatus with an improved radio-frequency system.

The circulator according to the invention has a ferrite, and the circulator is in proximity to an apparatus that generates a static magnetic field in its surroundings, such that the circulator is given its non-reciprocal property by interaction of the ferrite with the static magnetic field of the apparatus. The circulator exhibits its non-reciprocal property as long as the ferrite is arranged in the static magnetic field, and an interaction of the static magnetic field with the circulator thereby occurs. This means that, due to a stable arrangement of the circulator (i.e., the ferrite thereof) in the static magnetic field of the apparatus the circulator or its ferrite, the typically functioning, non-reciprocal property of the circulator can be ensured.

The circulator preferably is given its non-reciprocal property due to the interaction of the ferrite with only the static magnetic field of the apparatus. This means that no additional static magnetic field but only the static magnetic field that is generated by the apparatus accords the circulator the non-reciprocal functionality that is typical of a circulator.

In conventional circulators, the magnetic field that accords the ferrite an anisotropic permeability and the circulator its non-reciprocal functionality is generated by a magnet belonging to the circulator—typically by a permanent magnet. In contrast to this, the ferrite of the circulator according to the invention receives its anisotropic permeability due to the static magnetic field of the apparatus which, as an external apparatus, is not an actual component of the circulator. The module of the circulator that generates the magnetic field in conventional circulators thus can be fashioned significantly more simply or preferably can be entirely omitted, such that the circulator according to the invention can be produced more cost-effectively in comparison to conventional circulators.

Since this module in conventional circulators warms in the course of operation due to radio-frequency losses, and since this heating (as described above) negatively affects the precision and constancy of the signal transmission, the circulator according to the invention allows a particularly precise and constant signal transmission.

The circulator preferably includes an arrangement to cool the circulator. Because the ferrite of the circulator according to the invention is now better accessible, the arrangement for cooling can be designed comparably simply and can be arranged more efficiently in proximity to the ferrite or at the ferrite itself. For example, cooling by attachment of a cooling body or a heat pipe system can be achieved. The temperature of the circulator can hereby be kept largely constant in a simple manner during the operation, such that the signal transmission is improved with regard to its precision and constancy.

In one embodiment, the circulator is fashioned as a three-gate circulator.

In another embodiment, the circulator is fashioned as an isolator. This can be achieved by, for example, a third port of a circulator being terminated with a load installed into the circulator, such that a circulator so modified possesses only two gates that merely relay the fed power in one direction.

The apparatus that generates a static magnetic field in its surroundings is preferably a magnetic resonance apparatus. A magnetic resonance apparatus possesses a strong static magnetic field, such that this magnetic field that is typically used for magnetic resonance imaging is also advantageously used to the effect that the circulator receives its non-reciprocal property due to the interaction of the ferrite with the static magnetic field.

The frequency range of the circulator advantageously is the Larmor frequency of the magnetic resonance apparatus. In this way the circulator can be used in a radio-frequency system of the magnetic resonance apparatus. The modulation of the frequency of the circulator can be achieved by, among other things, the installation site that defines the strength of the external magnetic field, by the selection of the material of the ferrite and via the dimensioning of the adaptation circuit of the circulator.

The MRT apparatus according to the invention has a radio-frequency system that has a circulator as described above. As described above, the radio-frequency system that is equipped with the circulator allows a particularly precise and constant signal transmission.

The circulator is preferably arranged between a radio-frequency power amplifier and a radio-frequency antenna, wherein a first gate of the circulator is connected with the radio-frequency power amplifier and a second gate of the circulator is connected with a radio-frequency antenna. The transmission direction of the circulator proceeds from the first gate to the second gate.

As described above, components of the radio-frequency system (in particular of the radio-frequency power amplifier) are exposed to particular loads due to a non-optimal adaptation of the input protocols of the radio-frequency antenna. The use of the circulator in the radio-frequency system between the radio-frequency power amplifier and the radio-frequency antenna blocks waves that have been reflected at the radio-frequency antenna, or conducts these into a different channel so that the components of the radio-frequency system (in particular the radio-frequency power amplifier) are protected. It is possible to dimension the components that are protected from reflected waves by the circulator smaller overall since they no longer need to tolerate the additional load that would arise due to reflected waves. The radio-frequency system can hereby be produced more cost-effectively. Additionally, advantages with regard to a precise and constant signal transmission result due to the use of the circulator in the radio-frequency system of the magnetic resonance apparatus.

In a preferred embodiment, the circulator is arranged at an input port of the radio-frequency antenna. A wave reflected by the radio-frequency antenna is directly discharged at the input port in this way so that all further components of the radio-frequency system are protected.

In another embodiment, a third gate of the circulator is terminated by a load. In this case, the circulator acts as an isolator that lets the signals pass only in one direction—from the radio-frequency power amplifier to the radio-frequency antenna. The load thus can be attached to the circulator or be installed in the circulator.

In another embodiment, a third gate of the circulator is connected with a receiver. In this way an otherwise typical transmission-reception diplexer can be replaced by the circulator. In the transmission case, signals are conducted from the radio-frequency power amplifier via the first gate to the second gate and to the radio-frequency antenna. In the reception case, measurement signals are relayed by the radio-frequency antenna from the second gate via the third gate of the circulator to the receiver. The receiver is fashioned such that, at least in transmission operation, it represents a load, i.e. represents a fixed-power terminator that absorbs ("swamps") power coming from the antenna.

DESCRIPTION OF THE PREFERRED EMBODIMENTS

Figure 1:
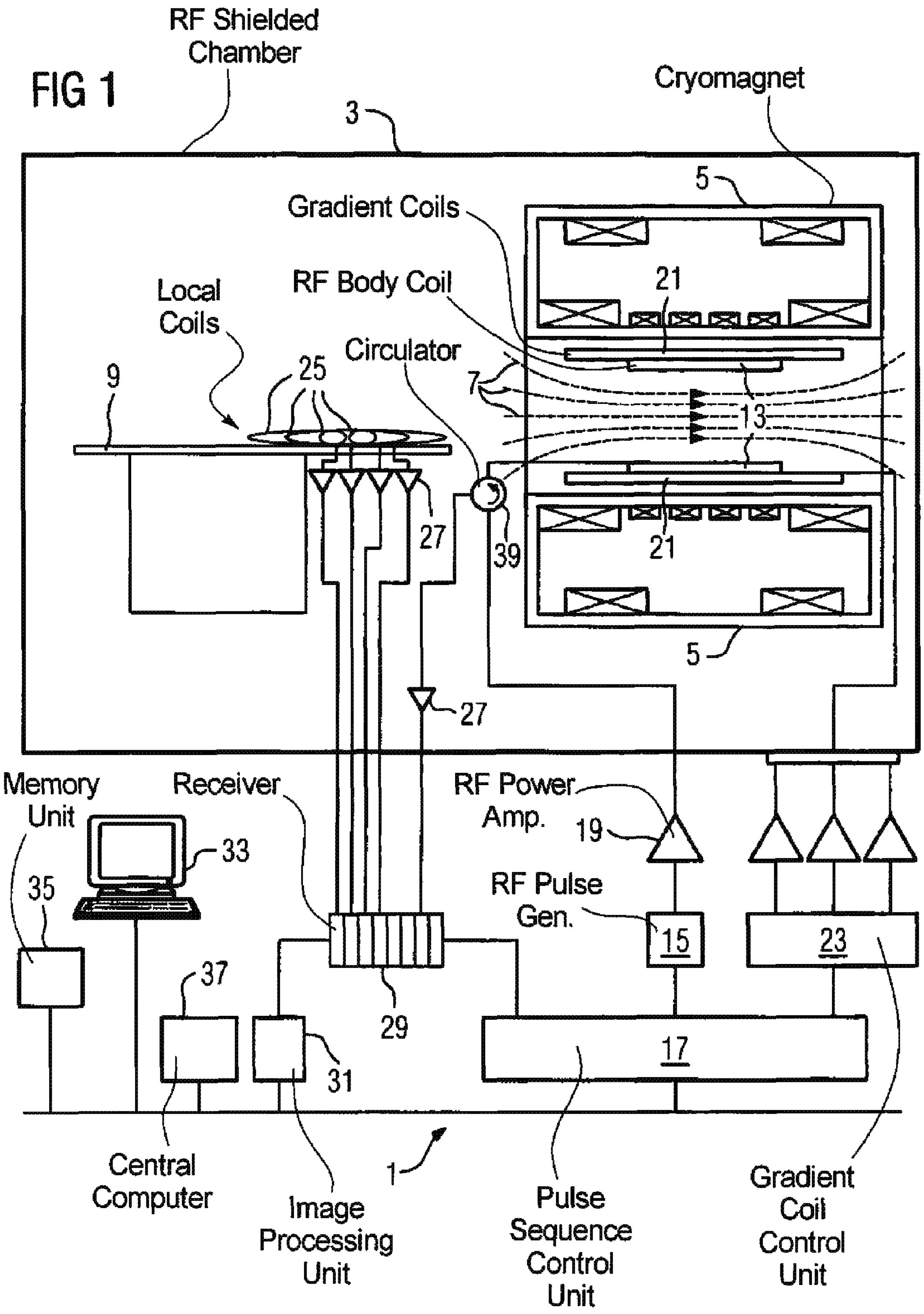
FIG. 1 schematically illustrates a magnetic resonance apparatus having a radio-frequency system embodying a circulator in accordance with the present invention.

FIG. 1 schematically shows the design of a magnetic resonance apparatus 1. The components of the magnetic resonance apparatus 1 with which the actual measurement is implemented are located in a radio-frequency-shielded measurement chamber 3. In order to examine a body by means of magnetic resonance imaging, various magnetic fields tuned as precisely as possible to one another in terms of their temporal and spatial characteristics are radiated at the body.

A strong magnet (typically a cryomagnet 5 with a tunnel-shaped opening) generates a static, strong basic magnetic field 7 that is typically 0.2 Tesla to 3 Tesla and more. A body (not shown) to be examined is borne on a patient bed 9 and positioned in the basic magnetic field 7.

The excitation of the nuclear spins of the body ensues via magnetic radio-frequency excitation pulses that are radiated via a radio-frequency antenna (shown here as a body coil 13). The radio-frequency excitation pulses are generated by a pulse generation unit 15 that is controlled by a pulse sequence control unit 17. After an amplification by a radio-frequency power amplifier 19, they are relayed to the radio-frequency antenna. The radio-frequency system shown here is merely schematically indicated. Typically more than one pulse generation unit 15, more than one radio-frequency power amplifier 19 and multiple radio-frequency antennas are used in a magnetic resonance apparatus 1.

Furthermore, the magnetic resonance apparatus 1 has gradient coils 21 with which gradient fields for selective slice excitation and for spatial coding of the measurement signal are radiated in a measurement. The gradient coils 21 are controlled by a gradient coil control unit 23 that, like the pulse generation unit 15, is connected with the pulse sequence control unit 17.

The signals emitted by the excited nuclear spins are received by the body coil 13 and/or by local coils 25, amplified by associated radio-frequency pre-amplifiers 27 and processed further and digitized by a receiver 29.

An image processing unit 31 generates an image from the measurement data, which image is presented to a user via an operating console 33 or is stored in a memory unit 35. A central computer 37 controls the individual system components.

The radio-frequency antenna with which the excitation pulses are radiated (in this case the body coil 13) must be adapted with optimal precision to the upstream radio-frequency system so that as little energy as possible is reflected at the input port of the radio-frequency antenna. As described above, however, an optimal adaptation of the radio-frequency antenna is not always possible.

If the radio-frequency antenna additionally has multiple input ports coupled among one another, as is often typical in magnetic resonance apparatuses, interfering couplings can occur between the individual antenna ports, such that the voltages over-coupled at the input ports add to a voltage reflected at the input port.

In order to prevent a signal returning at the input port of the radio-frequency antenna from returning to the radio-frequency system and loading this system, the input port of the radio-frequency antenna and the output port of the radio-frequency system are connected with a circulator 39, and in fact such that a signal sent from the radio-frequency power amplifier 19 to the radio-frequency antenna is passed through largely unattenuated by the circulator 39 while a signal in the reverse direction is largely blocked.

In the example shown here, the circulator 39 is simultaneously connected with the receiver 29 such that the circulator 39 fulfills the function of an otherwise necessary transmission-reception diplexer. However, this is merely one specific arrangement of the circulator 39 in the radio-frequency system of the magnetic resonance apparatus 1. Various arrangement variants are explained in detail later in FIG. 3 through FIG. 5.

The circulator 39 is arranged in proximity to the cryomagnet 5, and in fact such that the circulator 39 has the typical non-reciprocal property due to the interaction of the static basic magnetic field 7 with its ferrite. The circulator thus is given its non-reciprocal property as long as long as an interaction of its ferrite with the static basic magnetic field 7 occurs. The location of the attachment of the circulator 39 is thereby selected such that the magnetic field strength predominating there interacts with the circulator 39 (in particular with its ferrite) such that the circulator 39 is tuned to the Larmor frequency of the magnetic resonance apparatus 1.

Those locations at which the static basic magnetic field 7 has the magnetic field strength suitable for the operation of the circulator 39 form an area that is typically rotationally-symmetrical around the longitudinal axis of the cryomagnet 5. The circulator 39 can be arranged at multiple points of this area, advantageously at the point at which the feed or discharge cable can be fashioned optimally short and therefore cost-effectively.

In the event that multiple circulators 39 are used (for example to protect various input ports of a multi-port antenna), these can likewise be arranged rotationally-symmetrically around the longitudinal axis of the cryomagnet 5 since the strength of the basic magnetic field 7 remains the same at these locations.

Figure 2:
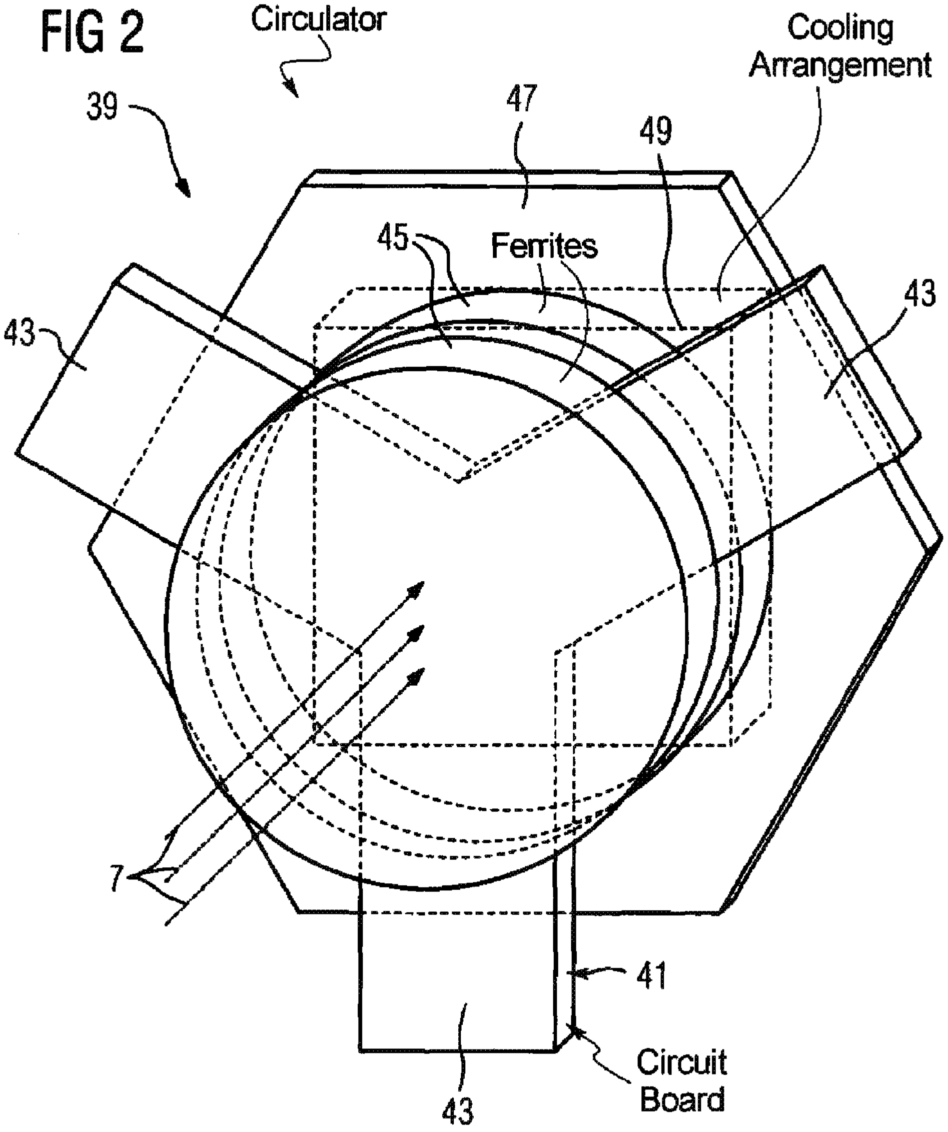
FIG. 2 is a perspective view of an embodiment of a circulator according to the present invention.

The design and the interaction of the ferrites with the magnetic field is now explained in detail now in FIG. 2.

The circulator 39 shown in FIG. 2 comprises an electrical circuit board 41 that possesses three gates 43 respectively offset by 120°. The electrical circuit board 41 in this embodiment is fashioned in a Y-shape. It can also exhibit other laminar shapes with a rotational symmetry of 120° as they are used in conventional circulators. The electrical circuit board 41 lies between two disc-shaped ferrites 45. For their part, the ferrites 45 lie between two base plates lying at the same potential, of which only the rear base plate 47 is shown for clarity.

The circulator 39 is arranged in proximity to the cryomagnet 5 such that the static basic magnetic field 7 generated by the cryomagnet 5 has a component that intersects the ferrite 45 perpendicularly. In this way the ferrite 45 has the typical gyrotropic property that imparts to the circulator 39 the non-reciprocal functionality typical to it. A power presented at one gate is passed on nearly unattenuated to the next gate while the following gate is largely decoupled.

Since the circulator 39 no longer needs permanent magnets for its function, the circulator 39 is overall more cost-effective to produce. Moreover, the circulator 39 can be cooled better and more efficiently since it has fewer components than a conventional circulator, and these fewer components are, moreover, better accessible. In the circulator 39 shown here, a centrally arranged cooling body 49 that dissipates the heat arising in the circulator 39 from the circulator 39 into the environment is schematically indicated at the rear base plate 47. Since the cooling of the circulator 39 can be designed more simply and efficiently, the operating temperature of the circulator 39 is subjected to fewer fluctuations in comparison to conventional circulators, such that a more precise and more constant signal transmission is achieved with the circulator 39.

Additional components of the circulator 39 such as, for example, connection bushings to connect conductors to the three gates of the circulator or dielectric separator layers that surround the ferrite 45 and contribute to the electrical separation of the circuit board 41 from the base plates 47 are not shown for clarity, however do not differ from known circulators.

Figure 3:
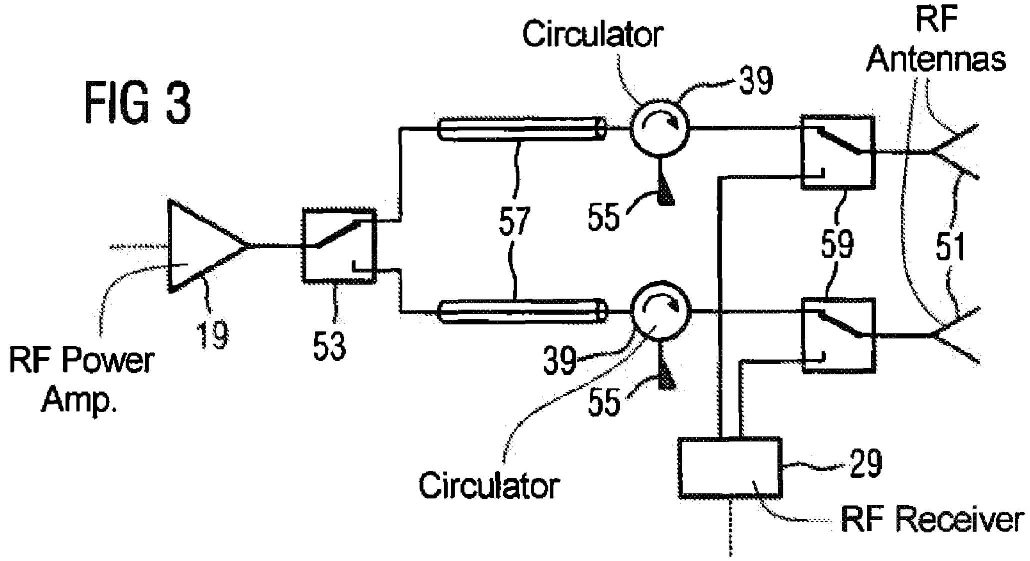
FIG. 3 schematically illustrates a first embodiment of a radio-frequency system of a magnetic resonance apparatus embodying a circulator according the present invention.
Figure 4:
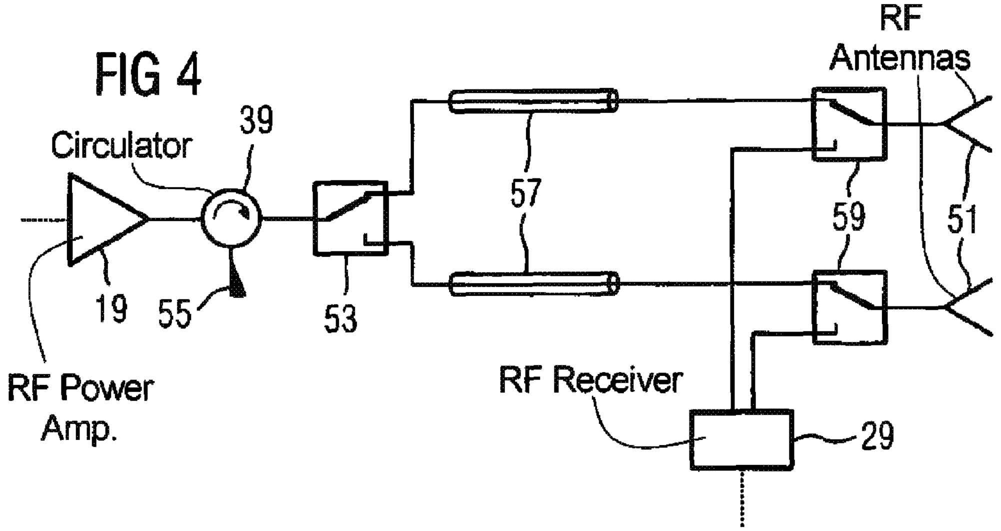
FIG. 4 schematically illustrates a second embodiment of a radio-frequency system of a magnetic resonance apparatus embodying a circulator according the present invention.
Figure 5:
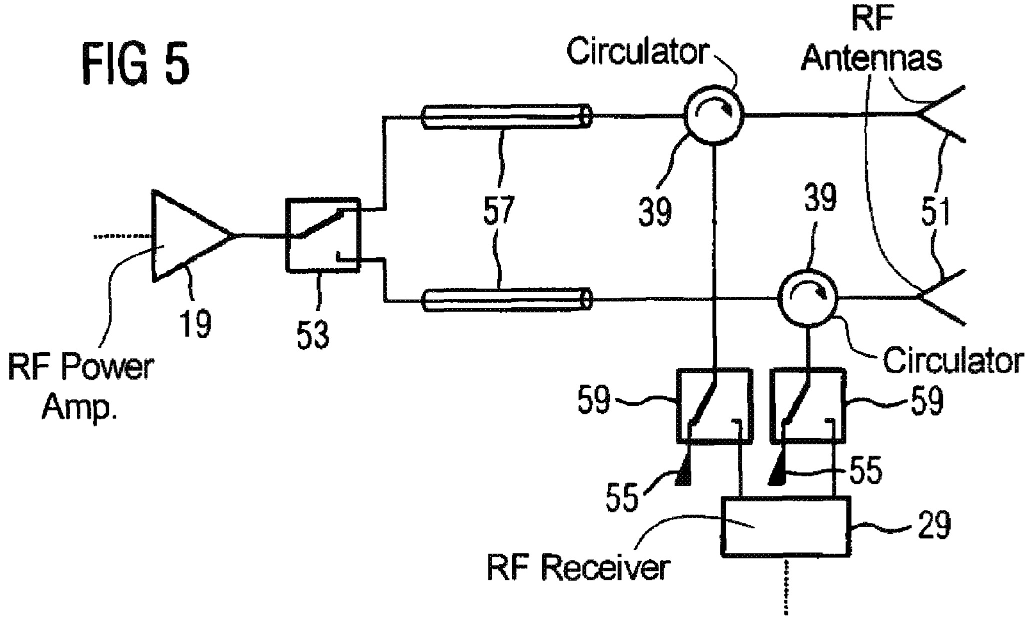
FIG. 5 schematically illustrates a third embodiment of a radio-frequency system of a magnetic resonance apparatus embodying a circulator according the present invention.

Various arrangement variants of the circulator 39 in a radio-frequency system of a magnetic resonance apparatus 1 are now explained in detail in FIG. 3 through FIG. 5. The principle of possible appropriate arrangements of the circulator 39 in the radio-frequency system is primarily explained in FIG. 3 through FIG. 5. The radio-frequency system itself is not limited to the forms shown in FIG. 3 through FIG. 5.

FIG. 3 shows a schematic section from a radio-frequency system of a magnetic resonance apparatus 1 in which the circulator 39 according to the invention is respectively arranged at an input port of a radio-frequency antenna 51. The radio-frequency system in the exemplary embodiment shown here is designed such that two different radio-frequency antennas 51 (for example a body coil and a body matrix coil) can be alternately activated via a coil diplexer 53 with the radio-frequency system. A circulator 39 is respectively arranged at each of the input ports of the radio-frequency antennas 51. The third gate of each circulator 39 is terminated with a load 55.

The signals coming from the radio-frequency power amplifier 19 are passed on by the circulators 39 to the radio-frequency antennas 51 while the energy of a wave that was reflected at the radio-frequency antennas 51 is discharged into the load 55. In this way the circulator 39 protects the components upstream from it, such as (for example) the radio-frequency power amplifier 19, the coil diplexer 53 or the supplying coaxial cables 57 that, due to this, can be designed more cost-effectively since they must tolerate smaller loads. The coaxial cables 57 are merely shown indicated in a section of the radio-frequency system for clarity.

A transmission-reception diplexer 59 is respectively located between the radio-frequency antennas 51 and the circulators 39, such that the two radio-frequency antennas 51 can also be used as receiver antennas. In this case a signal received by the radio-frequency antennas is relayed to a receiver 29.

FIG. 4 shows a schematic section of a different embodiment variant of the radio-frequency system. Here the circulator 39 is arranged at the output port of the radio-frequency power amplifier 19. In comparison to the variant in FIG. 3, this variant has the advantage that only one circulator 39 is necessary in order to protect the radio-frequency power amplifier 19. For this, the following components (such as the coaxial cable 57 leading to the radio-frequency antennas 51, the coil diplexer 53 or the transmission-reception diplexers 59) must be dimensioned so that they withstand the load due to a wave reflected at the radio-frequency antennas 51.

In the variants shown in FIG. 3 and FIG. 4, the third gate of the circulator 39 is respectively terminated with a load 55; the circulator 39 is thus used as a one-way conductor (isolator).

FIG. 5 shows an embodiment variant in which the circulators 39 are likewise arranged at the input ports of the radio-frequency antennas 51 but are simultaneously used as transmission-reception diplexers. In this embodiment, the third gate of the circulator 39 is connected with a receiver 29 so that—in the event that the radio-frequency antennas 51 are used to receive nuclear magnetic resonance signals—the reception signal is relayed by the circulator 39 to the receiver 29 of the radio-frequency system.

In this case the transmission-reception diplexers 59 connected between the circulators 39 and the receiver 29 serve to discharge a power discharged by the circulators 39 in transmission operation into a load. In the reception case, they transmission-reception diplexers 59 are switched such that the signal arriving from the circulator is relayed to the receiver 29. In that the transmission-reception diplexers 49 must only tolerate a load due to a return power, they can overall be dimensioned smaller compared with the transmission-reception diplexers 59 from FIG. 3 or 4, which must also tolerate the power provided by the radio-frequency power amplifier 19 in addition to the return power.

Although modifications and changes may be suggested by those skilled in the art, it is the intention of the inventors to embody within the patent warranted heron all changes and modifications as reasonably and properly come within the scope of their contribution to the art.

We claim as our invention:

1. A circulator comprising:

a circulator structure configured for placement in a magnetic resonance apparatus that produces a static magnetic field;

a plurality of circulator gates in said circulator structure among which electrical power is circulated in a sequence;

a ferrite in said circulator structure that interacts with said plurality of gates; and said ferrite having a non-reciprocal behavior by interaction of said ferrite with said static magnetic field generated by said magnetic resonance apparatus due to said placement of said circulator structure in said magnetic resonance structure.

2. A circulator as claimed in claim 1 wherein said ferrite is given said non-reciprocal behavior exclusively by interaction of the ferrite with said static magnetic field generated by said magnetic resonance apparatus.

3. A circulator as claimed in claim 1 comprising a cooling arrangement in thermal communication with said ferrite that cools said ferrite.

4. A circulator as claimed in claim 1 wherein said plurality of gates is three.

5. A circulator as claimed in claim 1 wherein said ferrite and said plurality of gates form an isolator.

6. A circulator as claimed in claim 1 wherein said magnetic resonance examination apparatus operates at a Larmor frequency, and wherein said circulator has a frequency range comprising said Larmor frequency.

7. A magnetic resonance apparatus comprising:

a magnetic resonance scanner configured to interact with an examination subject to acquire magnetic resonance stated therefrom;

said magnetic resonance scanner comprising a basic field magnet that generates a static magnetic field for use In acquiring said magnetic resonance data;

said magnetic resonance scanner comprising a radio frequency system operable to radiate radio frequency energy into the examination subject to generate magnetic resonance signals, in the presence of said static magnetic field corresponding to said magnetic resonance data; and said radio frequency system comprising a circulator located in said static magnetic field comprising a plurality of circulator gates among which radio frequency energy is circulated in a sequence, and a ferrite in communication with said gates, said ferrite having being a non-reciprocal circulation behavior with respect to said gates by interaction with said static magnetic field generated by said basic field magnet due to said circulator being located in said static magnetic field.

8. A magnetic resonance apparatus as claimed in claim 7 wherein said radio frequency system comprises a radio frequency power amplifier and a radio frequency antenna, and wherein said circulator is connected between said radio frequency power amplifier and said radio frequency antenna in said radio frequency system, with a first of said gates of said circulator connected to the radio frequency power amplifier and a second of the gates of the circulator connected with said radio frequency antenna.

9. A magnetic resonance apparatus as claimed in claim 8 wherein said radio frequency antenna has an input port, and wherein said circulator is connected at said input port.

10. A magnetic resonance apparatus as claimed in claim 8 when said radio frequency antenna has at least two input ports coupled with each other, with said circulator connected to one of said two input ports.

11. A magnetic resonance apparatus as claimed in claim 7 wherein said radio frequency system comprises a radio frequency power amplifier and a radio frequency antenna, and wherein said circulator is connected between said radio frequency power amplifier and said radio frequency antenna in said radio frequency system, with a first of said gates of said circulator connected to the radio frequency power amplifier and a second of the gates of the circulator connected with said radio frequency antenna, and wherein a third of said gates of said circulator is terminated by a load.

12. A magnetic resonance apparatus as claimed in claim 7 wherein said radio frequency system comprises a radio frequency power amplifier and a radio frequency antenna, and wherein said circulator is connected between said radio frequency power amplifier and said radio frequency antenna in said radio frequency system, with a first of said gates of said circulator connected to the radio frequency power amplifier and a second of the gates of the circulator connected with said radio frequency antenna, and wherein said radio frequency system comprises a radio frequency receiver, and wherein a third of said gates of said circulator is connected to said radio frequency receiver.

13. A magnetic resonance apparatus as claimed in claim 7 wherein said magnetic resonance scanner operates at a Larmor frequency, and wherein said circulator has a frequency range comprising said Larmor frequency.

* * * * *